United States Patent [19]

Fukui et al.

[11] Patent Number: 5,281,665
[45] Date of Patent: Jan. 25, 1994

[54] THERMOPLASTIC RESIN COMPOSITION

[75] Inventors: Hirofumi Fukui; Katsufumi Suga, both of Yokohama, Japan

[73] Assignee: Nippon Petrochemicals Co., Ltd., Japan

[21] Appl. No.: 737,403

[22] Filed: Jul. 29, 1991

[30] Foreign Application Priority Data

Jul. 30, 1990 [JP] Japan ............................ 2-201804

[51] Int. Cl.$^5$ .................. C08L 25/08; C08L 33/08; C08L 33/10; C08L 23/04
[52] U.S. Cl. ............................... 525/84; 525/240; 525/227; 525/241; 525/154; 525/420; 525/132
[58] Field of Search ................ 525/84, 240, 227, 241, 525/154, 420, 132

[56] References Cited

U.S. PATENT DOCUMENTS

| 4,279,659 | 7/1981 | Unmuth | 524/277 |
| 4,768,987 | 9/1988 | Usvi et al. | 524/575 |

FOREIGN PATENT DOCUMENTS 0229498 7/1987
0234819 9/1987 European Pat. Off.
0284379 9/1988 European Pat. Off.
0316037 5/1989

OTHER PUBLICATIONS

Derwent Abstract of JP-A-60 203 667, (Mar. 28, 1984).

*Primary Examiner*—James J. Seidleck
*Assistant Examiner*—W. R. H. Clark
*Attorney, Agent, or Firm*—Ostrolenk, Faber, Gerb & Soffen

[57] ABSTRACT

A thermoplastic resin composition is here provided which comprising
99 to 50% by weight of at least one of engineering plastics (A) and
1 to 50% by weight of an ethylene copolymer (B) having at least one of carbon-carbon unsaturated double bonds, and
1 to 200 parts by weight, based on 100 parts by weight of the resin (A)+(B), of at least one selected from the group consisting of a rubber-like elastomer (C) and-/or an olefin polymer or copolymer (D).

5 Claims, No Drawings

THERMOPLASTIC RESIN COMPOSITION

BACKGROUND OF THE INVENTION (1) Field of the Invention

The present invention relates to a thermoplastic resin composition having excellent mechanical toughness, particularly impact resistance and heat resistance of molded articles made therefrom. This composition of the present invention can be widely utilized as materials for electrical and electronic parts, automobile parts and the like.

(2) Description of the Prior Art

Engineering plastics are excellent in heat resistance, modulus elasticity, mechanical strength, and impact resistance, and in recent years, they are known as a substitute for metallic materials. In addition, engineering plastics have a variety of characteristics such as light weight, excellent moldability and coloration, and can be widely used as indispensable industrial materials for structural and machinery parts of automobiles, electrical and electronic products, and precision machinery and tools.

These engineering plastics are divded broadly into the following two categories.

Engineering plastics for popular use:
polyamides (PA); aromatic polyesters such as polyethylene terephthalates (PET) and polybutylene terephthalates (PBT);
polyphenylene oxides (PPO); polyacetals (POM); polycarbonates (PC); ABS resins.

Heat-resistant super engineering plastics:
polyphenylene sulfides (PPS); polyarylates (PAR);
polyether ether ketone resins (PEEK); liquid crystal polymers (LCP).

With regard to these engineering plastics, noncrystalline plastics such as PC, PPO, ABS and the like are somewhat poor in solvent resistance and flowability in comparison with crystalline plastics such as aromatic polyesters, PPS, LCP and the like.

Crystalline plastics are excellent in heat resistance, modulus of elasticity, but have the disadvantages that they are by nature brittle and anisotropic. For example, aromatic polyester resins are excellent in mechanical strength, but poor in impact resistance, especially in notched Izod impact strength.

For the purpose of improving the impact resistance of aromatic polyester resins, a method has been proposed in which a rubber-like polymer is blended with the resins. However, when a rubber-like polymer is mixed in a relatively large amount to improve the impact resistance, the heat resistance of the resulting mixture which is a feature of the aromatic polyester resins is impaired unpreferably, because such a rubber-like polymer as an effective modifier for impact resistance has a glass transition temperature below ambient temperature.

In the recent years, some methods for solving these problems are disclosed. For example, in Japanese Patent Unexamined Publication Nos. 52-32045 and 53-117049, there are described examples using a copolymer of an α-olefin with an α, β-unsaturated glycidyl ester to be blended in order to improve the heat resistance. Japanese Patent Unexamined Publication No. 60-40154 discloses also an improved method wherein a modified polymer obtained by grafting a monomer such as α, β-unsaturated glycidyl esters on to a copolymer of an α-olefin with a nonconjugated diene. These approaches have been solving these problems to a certain extent.

Further, PA are excellent in moldability, heat resistance, abrasion resistance and solvent resistance, but they are poor in dimensional stability because they are highly hygroscopic.

As for PPO resins, they are excellent in mechanical and electrical properties, heat resistance and dimensional stability, but poor in moldability, oil resistance and impact resistance.

PC resins are excellent in heat resistance, mechanical strength, impact resistance, but poor in chemical resistance , and POM resins are excellent in dimensional stability and mechanical properties, but poor in impact resistance.

As for ABS resins, they are excellent in impact strength, but poor in chemical resistance.

Furthermore, PPS resins are excellent in heat resistance and flame resistance, but poor in ductility.

PAR and LPC are excellent in heat resistance, but poor in impact resistance.

Various attempts have been made to obviate these drawbacks. Among them, resin compositions containing the aforesaid modifier, composite plastics with filler and glass fiber, and polymer alloys made from several kinds of engineering plastics have been proposed. However, the heat resistance is deteriorated in the compositions containing a rubber-like modifier, and impact resistance is impaired in the composite plastics containing fiber or filler, and the features of the engineering plastics are spoiled more or less in the polymer alloy.

SUMMARY OF THE INVENTION

The purpose of the present invention is to provide a thermoplastic resin composition wherein above-mentioned drawbacks in engineering plastic compositions may be restrained to a minimum.

The first aspect of the present invention is directed to a thermoplastic resin composition comprising
  99 to 50% by weight of at least one of engineering plastics (A) and
  1 to 50% by weight of an ethylene copolymer (B) having carbon-carbon unsaturated double bonds.

The second aspect of the present invention is directed to a thermoplastic resin composition comprising
  99 to 50% by weight of at least one of engineering plastics (A) and
  1 to 50% by weight of an ethylene copolymer (B) having carbon-carbon unsaturated double bonds, and
  1 to 200 parts by weight, based on 100 parts by weight of the resin (A)+(B), of at least one selected from the group consisting of a rubber-like elastomer(C) and/or an olefinic polymer or copolymer (D).

DETAILED DESCRIPTION OF THE INVENTION

The engineering plastics (A) used in the present invention is a plastic resin selected from the group consisting of:
  super high-molecular polyethylenes, polypropylenes, poly-1-butenes, poly-4-methyl-1-pentenes, polystyrenes; polystyrene-based copolymers such as styrene/acrylonitrile copolymers, styrene/methyl methacrylate/acrylonitrile copolymers, α-methylstyrene/styrene/acrylonitrile copolymers, ABS (acrylonitrile/butadiene/styrene copolymers) , MBS (methyl methacrylate/butadiene/styrene copolymers), AES(acrylonitrile/EPR/styrene copolymers), AAS (acryl rubber/acrylonitrile/styrene copolymers);

polymethacrylate-based resins; polyacetal-based resins;

polyamide-based resins; polycarbonate-based resins;

polyphenylene ether-based resins; polyester-based resins; liquid crystal polymers; polysulphone resins; polyether sulphone resins; polyphenylene sulfide resins;

polyether ether ketone resins; polyarylate resins; polyamide imide resins; polyimide resins; polyfluorocarbon resins; and mixtures thereof.

The copolymer (B) having carbon-carbon unsaturated double bonds used in the present invention is an ethylene copolymer obtained by copolymerization of 50 to 99.99% by weight of ethylene (B1), 0.01 to 10% by weight of a monomer (B2) having two or more carbon-carbon double bonds, and less than 40% by weight of an other unsaturated monomer (3).

Examples of said monomer having two or more carbon-carbon double bonds (hereinafter referred to as curable monomer) include:

vinyl acrylate and vinyl methacrylate; allyl acrylate and allyl methacrylate; ethylene diacrylate and ethylene dimethacrylate; butylene diacrylate and butylene dimethacrylate; diallyl maleate; diallyl fumarate; triallyl cyanurate; triallyl isocyanurate; trivinyl benzene; diallyl phthalate; triallyl phosphate; divinyl benzene; trivinyl benzene; allyl cyclohexyl diacrylate, bisphenol-A dimethacrylate, polyethylene glycol diacrylate and polyethlene glycol dimethacrylate, polypropylene glycol diacrylate and polypropylene glycol dimethacrylate, trimethylolpropane triacrylate, and the like. Above all, vinyl acrylate and vinyl methacrylate, allyl acrylate and allyl methacrylate are particularly preferred.

Examples of said other unsaturated monomer (B3) include epoxy-containing unsaturated monomers such as glycidyl acrylate and glycidyl methacrylate; itaconic acid monoglycidyl ester; butenetricarboxylic acid monoglycidyl ester; butenetricarboxylic acid diglycidyl ester; butenetricarboxylic acid triglycidyl ester; and glycidyl esters or vinyl glycidyl ethers of α-chloroallyl, maleic acid, crotonic acid and fumaric acid; allyl glycidyl ether; glycidyl oxyethylvinyl ether; glycidyl ethers such as styrene-p-glycidyl ether; and p-glycidyl styrene; and the like.

Examples of said unsaturated monomer other than epoxy-containing monomers include vinyl esters such as vinyl acetate, vinyl propionate and vinyl benzoate; acrylic acid and methacrylic acid; acrylic and methacrylic acid esters such as methyl, ethyl, propyl, butyl, 2-ethylhexyl, cyclohexyl, dodecyl and octadecyl acrylates and methacrylates; maleic acid; maleic anhydride; itaconic acid; fumaric acid, maleic monoesters and diesters; vinyl chloride; vinyl ethers such as vinyl methyl ether; and vinyl ethyl ether; and acrylamide-based compounds. Of these monomers, preferable ones are glycidyl methacrylate; allyl glycidyl ether; acryl esters; and vinyl acetate.

Examples of the ethylene copolymer used in the instant invention include ethylene/allyl (meth) acrylate copolymers; ethylene/vinyl (meth) acrylate copolymers; ethylene/glycidyl methacrylate/allyl (meth) acrylate copolymers; ethylene/glycidyl (meth) acrylate -vinyl (meth) acrylate copolymers; ethylene/ethyl acrylate/allyl (meth) acrylate copolymers; ethylene/ethyl acrylate/allyl (meth) acrylate copolymers; ethylene/ethyl acrylate/vinyl (meth) acrylate copolymers; ethylene/methyl acrylate/allyl (meth) acrylate copolymers; ethylene/methyl acrylate/vinyl (meth) acrylate copolymers; ethylene/vinyl acetate/allyl (meth) acrylate copolymers; ethylene/vinyl acetate/vinyl (meth) acrylate copolymers; ethylene/n-butyl acrylate/allyl (meth) acrylate copolymers; ethylene/n-butyl acrylate/vinyl (meth) acrylate copolymers; ethylene/glycidyl methacrylate/ethyl or methyl or n-butyl acrylate/allyl or vinyl (meth) acrylate copolymers; ethylene/glycidyl methacrylate/vinyl acetate/allyl or vinyl (meth) acrylate copolymers; and mixtures thereof. Of these ethylene copolymers, ethylene/allyl methacrylate copolymers; ethylene/glycidyl methacrylate/allyl methacrylate copolymers; ethylene/ethyl acrylate/allyl methacrylate copolymers; ethylene/vinyl acetate/allyl methacrylate copolymers; ethylene/glycidyl methacrylate/ethyl acrylate/allyl methacrylate copolymers are particularly preferred.

The copolymer (B) is in an amount from 1 to 50%, preferably from 3 to 35% by weight based on the weight of at least one of the engineering plastics.

When the amount of the copolymer is less than 1% by weight, the effect of retaining the characteristics of the engineering plastics is poor, and when it is in excess of 50% by weight, heat resistance of the composition is impaired.

The rubber-like elastomer (C) used in the present invention is a diene-type or nondiene-type rubber having a glass transition temperature below $-20°$ C.

Typical examples of the elastomer (C) are $\alpha$, $\beta$-unsaturated nitrile/conjugated diene copolymer rubbers. Said $\alpha$, $\beta$-unsaturated nitriles include methacrylonitrile, ethacrylonitrile, acrylonitrile, and the like. Of these nitriles, acrylonitrile is particularly preferred.

Typical examples of the conjugated diene include isoprene, chloroprene, 1,3-butadiene, 2-methyl-1,3-butadiene, 2,3-dimethyl-1,3-butadiene, and the like. Of these dienes, 1,3-butadiene and isoprene are preferred.

Said copolymer rubber may have one or more functional groups selected from the group consisting of hydroxyl, epoxy, carboxyl, and amino.

Of these copolymer rubbers, a copolymer rubber with an average hydrogenation rate of the unsaturated bonds in the molecule of more than 70% is particularly preferred.

Examples of the acryl-type elastomer include polymers obtained by polymerization of monomers such as methacrylic or acrylic esters. The acryl-type elastomers are prepared by grafting at least one of vinyl monomers on to a rubberlike polymer containing in the molecule 40% by weight or more of a (meth) acryl ester unit such as methyl acrylate, ethyl acrylate, butyl acrylate, propyl acrylate, 2-ethylhexyl acrylate; and n-octyl methacrylate unit.

These acryl or methacryl ester polymers may be prepared by copolymerization of a (meth) acryl ester with a diene monomer such as butadiene, or by copolymerization of a (meth) acryl ester with 0.05 to 3% by weight of at least one of curable comonomers selected from the group consisting of butylene di(meth) acrylate; polyols such as trimethylolpropane trimethacrylate; (meth) acryl esters; divinyl benzene; vinyl compounds such as vinyl (meth) acrylate; allyl (meth) acrylate; diallyl maleate; diallyl fumarate; triallyl cyanurate; glycidyl methacrylate, and the like.

Examples of the vinyl monomer which is grafted on to these (meth) acryl ester polymers include methyl (meth) acrylate; ethyl (meth) acrylate; butyl (meth) acrylate; styrene; α-methyl styrene; (meth) acrylonitrile; and the like.

The conjugated diene polymer or conjugated diene/aromatic vinyl copolymer is a (co)polymer of at least one of conjugated dienes or a copolymer of a diene with an aromatic vinyl compound. Typical examples of the conjugated diene include 1,3-butadiene, isoprene, 1,3-pentadiene, and the like, with 1,3-butadiene being most preferred.

Examples of the aromatic vinyl compound include styrene and α-methyl styrene, with styrene being preferred.

Although said conjugated diene/aromatic vinyl copolymer may be a random or block copolymer, a block copolymer having a molecular structure in which both terminals of the conjugated diene block are blocked with an aromatic vinyl compound block is most preferred. Of these block copolymers, a styrene/butadiene/styrene block copolymer with a hydrogenation rate of the unsaturated bonds of more than 80% is particularly preferred.

Examples of the ethylene/α-olefin copolymer rubber used in the present invention include copolymer rubbers of ethylene with an α-olefin such as propylene, butene-1, pentene-1, hexene-1, octene-1, and the like. Such a copolymer rubber may be a terpolymer of ethylene, an α-olefin and a nonconjugated diene such as 1,4-pentadiene; 2-methyl-1,5-hexadiene; 1,4-hexadiene; 7-methyl-1,6-octadiene; 5-ethylidene-2-norbornene; 5-methylene-2-norbornene; dicyclopentadiene; and the like.

Above all, 5-ethylidene-2-norbornene and dicyclopentadiene are preferable.

Other examples of the rubber-like elastomer (C) used in the invention include chlorinated polyethylenes; chlorosulfonated polyethylenes; ethylene/vinyl acetate copolymers; ethylene/methyl (meth) acrylate copolymers; ethylene/ethyl (meth) acrylate copolymers, ethylene/butyl (meth) acrylate copolymers, thermoplastic urethane elastomers prepared by polycondensation of a polyester or polyether with a isocyanate: polyether ester block copolymers prepared by block copolymerization of PBT with a polytetramethylene glycol; silicone rubbers; butyl rubbers, and mixtures thereof.

Typical examples of the olefin polymer or copolymer (D) used in the present invention include α-olefin ($C_2-C_{12}$) polymers and copolymers such as low-density, medium-density and high-density polyethylenes; linear low-density polyethylenes; super low-density polyethylenes; copolymers of ethylene with other α-olefins such as propylene, butene-1, 4-methyl-1-pentene, octene 1; homopolymers such as polypropylene, polybutne-1; copolymers of ethylene with an unsaturated carboxylic acid or acid derivative such as ethylene/glycidyl methacrylate copolymers; ethylene/ethyl acrylate copolymers; ethylene/methyl acrylate copolymers; ethylene/n-butyl acrylate copolymers; ethylene/vinyl acetate copolymers; ethylene/glycidyl methacrylate/ethyl acrylate copolymers; ethylene/glycidyl methacrylate/methyl acrylate copolymers; ethylene/glycidyl methacrylate/n-butyl acrylate copolymers; ethylene/glycidyl methacrylate/vinyl acetate copolymers; ethylene/vinyl esters copolymers such as ethylene/vinyl acetate copolymer; and mixtures thereof.

The amount of at least one selected from the group consisting of a rubber-like elastomer (C) and/or an olefin polymer or copolymer (D) is 1 to 200 parts by weight, preferably 3 to 100 parts by weight, more preferably 5 to 70 parts by weight, based on 100 parts by weight of the total of the engineering plastic (A) and the ethylene copolymer (B). When the amount is less than 1 part by weight, its improvement effect is not exerted sufficiently, and when it is more than 200 parts by weight, inherent mechanical properties of the engineering plastics are impaired unpreferably.

The ethylene copolymer (B) used in the present engineering plastic compositions is a curable polymer having carbon-carbon double bonds to which curing occurs in the presence of radicals which form by heating the composition.

When heating the composition of the present invention, curing occurs not only in the copolymer (B) itself but also in at least one selected from the group consisting of the rubber-like elastomer (C) and/or the olefin polymer or copolymer (D). Further, co-curing between the ethylene copolymer (B), and at least one selected from the group consisting of the rubber-like elastomer (C) and/or the olefin polymer or copolymer (D) takes place at the same time, whereby the heat resistance and impact strength of the present composition are improved substantially.

In the present invention, any conventional curing agents may be used additionally to accelerate the curing.

The kind of above-mentioned curing agents (E) depends on the kinds of ethylene copolymers (B), rubber-like elastomers (C) and/or olefin polymer or copolymer (D) to be blended with the engineering plastic compositions.

Examples of preferred curing agent (E) include organic peroxides such as diacetylperoxide, dibenzoylperoxide, bis-2,4-dichlorobenzoylperoxide, di-tert.-butylperoxide, dicumylperoxide; metallic oxides such as zinc oxide, magnesium oxide, lead peroxide, and metallic derivatives of maleic acid; resinous curing agents such as epoxy resins, melamine resins, phenolic resins; amine derivatives such as triethyl trimethylenetriamine, triethylenetetramine, hexamethylenediamine carbamate, N,N'-dicinnamylidene-1,6-hexanediamine; quionon dioxime such as p-benzoquinone oxime, p,p'-dibenzoquinone dioxime, and mixtures thereof.

The curing agent (E) is usually employed in an amount of 0.01 to 10% by weight based on the total weight of all the polymers except the engineering plastics.

Furthermore, it is important that such curing agents are selected from those which are compatible with the composition and do not adversely affect the performance of the engineering plastics employed.

In the instant invention, a conventional compatibility agent used for alloying engineering plastics may be additionally employed. Such compatibility agent is a graft copolymer (F) of a modified polyolefin containing functional groups in the molecule with an addition polymer containing a peroxide group in the molecule.

Examples of the graft polymer (F) include poly(ethylene/acrylic acid)-g-poly(butyl acrylate-b-styrene)(-wherein, g is referred to graft and b is referred to block copolymer); poly(ethylene/methacrylic acid/methacrylic acid Na-salt)-g-poly(butyl acrylate-b-styrene); poly(ethylene/methacrylic acid/methacrylic acid Zn-salt)-g-poly(butyl acrylate-b-styrene); poly(ethylene/- methyl methacrylate/methacrylic acid Mg-salt)-g-poly(butyl acrylate-b-styrene); poly(ethylene/methyl acrylate)-g-poly(butyl acrylate-b-styrene); poly(ethylene/methyl acrylate/acrylic acid)-g-poly(butyl acrylate-b-styrene); poly(ethylene/ethyl acrylate)-g-poly(butyl acrylate-b-styrene); poly(ethylene/glycidyl methacrylate)-g-poly(butyl acrylate-b-styrene); poly(ethylene/vinyl acetate/glycidyl methacrylate)-g-poly(butyl acrylate-b-styrene); (polyethylene-g-maleic anhydride)-g-poly(butyl acrylate-b-styrene); (polypropylene-g-maleic anhydride)-g-poly(butyl acrylate-b-styrene); poly[(ethylene/propyrene)-g-maleic anhydride]-g-poly(butyl acrylate-b-styrene); poly[(ethylene/propyrene/1,4-hexadiene)-g-maleic anhydride]-g-poly(butyl acrylate-b-styrene); poly[(ethylene/propyrene/dicyclopentadiene)-g-maleic anhydride]-g-poly(butyl acrylate-b-styrene); poly(ethylene/acrylic acid)-g-poly(butyl acrylate-b-methyl acrylate); poly(ethylene/methacrylic acid/methacrylic acid Na-salt)-g-poly(butylacrylate-b-methyl acrylate); poly(ethylene/methacrylic acid/methacrylic acid Zn-salt)-g-poly(butyl acrylate-b-methyl acrylate); poly(ethylene/methyl acrylate)-g-poly(butyl acrylate-b-methyl acrylate); poly(ethylene/glycidyl methacrylate)-g-poly(butyl acrylate-b-methyl acrylate); poly(ethylene/vinyl acetate/glycidyl methacrylate)-g-poly(butyl acrylate-b-methyl acrylate); (polyethylene-g-maleic anhydride)-g-poly(butyl acrylate-b-methyl acrylate); (polypropylene-g-maleic anhydride)-g-poly(butyl acrylate-b-methyl acrylate); poly[(ethylene/propylene)-g-maleic anhydride]-g-poly(butyl acrylate-b-methyl acrylate); poly(ethylene/glycidyl methacrylate)-g-poly(styrene); poly(ethylene/glycidyl methacrylate)-g-poly(acrylonitrile/styrene); poly(ethylene/glycidyl methacrylate)-g-poly(methyl methacrylate); and the like.

Any method may be employed for the production of these graft copolymers.

In accordance with the present invention, when a graft copolymer of a modified polyolefin above-mentioned is blended as a compatibility agent, an engineering plastic composition can be obtained in which impact resistance, heat resistance which are features of said engineering plastics are further enhanced due to promotion of the mutual compatibilities of the raw engineering plastics.

Typical combinations of raw engineering plastic materials are as follows:
PP/PA, PP/PPO, PP/ABS, PA/PPO, PBT/PPO, ABS/PA, ABS/PBT, ABS/PPO, ABS/PC, PPO/PC, PBT/PC, PPS/PPO, PPS/PA, PS/PPO, LCP/PEs (wherein, PP, PA, PPO, PBT, ABS, PC, PPS, PS, LCP, and PE mean successively polypropylene, polyamide, polyphenyleneoxide, polybutylene terephthalate, acrylonitrile/butadiene/styrene copolymer, polycarbonate, polyphenylene sulfide, polysulfone, liquid crystal polymers, polyester).

According to the present polymer alloys, by selection of the functional groups of a copolymer (B) or a graft copolymer (F) of a modified polyolefin, a new thermoplastic composition is provided which comprises several kinds of mutually noncompatible engineering plastics, either of the components being in a homogeneous phase and which retains excellent features of each of the raw engineering plastic materials without any deterioration effect of the compatibility agent on the properties of the raw engineering plastic materials In the present invention, an inorganic filler may be used in an amount up to 200% by weight, preferably up to 150% by weight based on the total weight of the present composition, to improve further mechanical strength and heat resistance of the molded articles made therefrom.

The present compositions may be manufactured by use of any conventional kneader such as a mixing roll mill, a Banbury's mixer, a kneader mixer, a kneading extruder, a biaxial extruder.

In order to mold the aromatic polyester compositions of the present invention, a conventional injection molding and extrusion molding process may be used whereby molded articles having excellent performances are obtained.

In the present invention, the following materials may be additionally employed, in so far as they do not deviate from the gist of the present invention: an antioxidant, ultraviolet inhibitor, carbon black, anti-static agent, lubricant, release agent, dye, pigment, colorant, flame retardant, plastisizer, age resistor, and mixtures thereof.

Now, the present invention will be described in detail in reference to examples.

Referential Example 1

(Preparation of Ethylene Copolymer)

In a stainless steel autoclave fitted with a stirrer were placed ethylene, a monomer shown in Table 1 and n-hexane as a chain transfer agent after air was removed by blowing nitrogen and ethylene through the autoclave, and di-tert.-butyl peroxide as a polymerization initiator was further added.

Afterward, the autoclave was heated up to a temperature of 170° C. and polymerization was performed at a pressure of 1600 Kg/cm$^2$ for 60 minutes.

Other modifiers and graft copolymers to be used are also set forth in Table 1. Table 1 gives the resulting ethylene copolymers.

EXAMPLES 1–13 AND COMPARATIVE EXAMPLES 1–6

ABS resin (trade name JSR ABS 15A; made by Japan Synthetic Rubber Co., Ltd.) was dry-blended with polyacetal resin (which is denoted by POM in Tables) (trade name Tenac 5010; made by Asahi Chemical Co., Ltd.) and modifier in ratios shown in Table 2.

The melting/mixing process was carried out by feeding the respective mixtures into a one-directional two-screw extruder having a screw diameter of 30 mm. (trade name BTC/S-30; made by Plastic Engineering Institute). The mixed resin was then formed into granules, and the latter were dried at 150° C. for 3 hours under reduced pressure, followed by injection molding by an injection molding machine (trade name IS-90; made by Toshiba Machine Co., Ltd.) at a die temperature of 60° C., and a cylinder temperature of 250° C. for ABS, and 200° C. for POM to prepare specimens for notched Izod impact strength. The test results are shown in Table 2.

EXAMPLES 14–24 AND COMPARATIVE EXAMPLES 7–13

The same procedure as in Example 1 was repeated with the exception that polybutylene terephthalate resin (which is denoted by PBT in Tables) (trade name Balox 310; made Engineering Plastics Co., Ltd.) was blended with polyethylene terephthalate resin (which is denoted by PET in Tables)(trade name Belpet EFG-6; made by Kanegafuchi Chemical Industry Co., Ltd.) and modifier in ratios shown in Table 3. The results are set forth in Table 3.

EXAMPLES 25-31 AND COMPARATIVE EXAMPLES 14-17

The same procedures as in Example 1 was repeated with the exception that Nylon 6 (which is denoted by PA in Tables) (trade name Nylon T 803; made by Toyobo Co., Ltd.) was blended with modifier. The test results are set forth in Table 4.

EXAMPLES 32-41 AND COMPARATIVE EXAMPLES 18-23

ABS resin or POM resin above-mentioned was dry-blended with propylene homopolymer (which is denoted by PP in Tables) (MFR 4, trade name NISSEKI Polypro J 130G; made by Nippon Petrochemicals Co., Ltd.) and modifier in ratios shown in Table 5.

Afterwards, speciments for notched Izod impact strength were prepared by the same procedure as described in Example 1 or 9. The test results are set forth in Table 5.

EXAMPLES 42-51 AND COMPARATIVE EXAMPLES 24-29

PBT resin or PA resin aforesaid was dry-blended with polypropylene and modifier in ratios shown in Table 6. Specimens for notched Izod impact strength were prepared by the same procedure as described in Example 1. The test results are set forth in Table 6.

EXAMPLES 56-61 AND COMPARATIVE EXAMPLES 30-35

PA resin aforesaid and PPO resin (trade name Cylon G010Z; made by Asahi Chemical industry Co., Ltd.) were blended with POM resin and modifier in retios shown in Table 7. Specimens for Izod impact strength were prepared by a extruding machine at a cylinder temperature of 280° C. and a die temperature of 80° C. The test results are set forth in Table 7.

EXAMPLES 62-71 AND COMPARATIVE EXAMPLES 36-41

PA resin aforesaid and PC resin (trade name Rexene 121; made by Engineering Plastics Co., Ltd.) were blended with PPS resin (trade name Shinetsu PPS 1003; made by Shinetsu Polymer Co., Ltd.) in ratios shown in Table 8. Specimens were prepared by use of a extruding machine at a cylinder temperature of 280° C. and a die temperature of 90° C. The test results are set forth in Table 8.

EXAMPLES 72-81 AND COMPARATIVE EXAMPLES 42-47

Aforesaid PBT resin and PPO resin were blended with POM resin aforesaid in ratios shown in Table 9.

Specimens for PPO were prepared by use of a extruding machine at a cylinder temperature of 280° C. and a die temperature of 80° C.

The other specimens were also prepared by the same procedure as in Example 1. The test results are given in Table 9.

EXAMPLES 82-91 AND COMPARATIVE EXAMPLES 48-53

Aforesaid PBT resin and PC resin were blended with PPS resin in ratios shown in Table 10.

Specimens for PC and PPS were prepared by use of a extruding machine at a cylinder temperature of 280° C. and 300° C. respectively, and a die temperature of 90° C. The test results are set forth in Table 10 °C.

EXAMPLES 92-101 AND COMPARATIVE EXAMPLES 54-59

Aforesaid POM and PC resin were blended with PPS resin in ratios shown in Table 11. Specimens for PC and PPS were prepared by use of a extruding machine at a cylinder temperature of 280° C. for PC and 290° C. for PPS, and a die temperature of 90° C. The results are shown in Table 11.

EXAMPLES 102-111 AND COMPARATIVE EXAMPLES 60-65

Aforesaid ABS and PA resin were blended with PBT resin in ratios shown in Table 12. Specimens were prepared by the same procedure as described in Example 1. The test results are set forth in Table 12.

EXAMPLES 112-121 AND COMPARATIVE EXAMPLES 66-71

Aforesaid ABS resin and POM resin were blended with PPS resin in ratios shown in Table 13. Specimens for PPS were prepared by use of a extruding machine at a cylinder temperature of 290° C. and a die temperature of 90° C. The other specimens were prepared by the same procedure as described in Example 1. The test results are shown in Table 13.

TABLE 1

| | Ethylene Copolymers | Ratio of Composition (Wt. %) |
|---|---|---|
| B-1 | Ethylene/allyl methacrylate (E/AMA) | E:98.3/AMA:1.7 |
| B-2 | Ethylene/allyl methacrylate (E/AMA) | E:97.2/AMA:2.8 |
| B-3 | Ethylene/allyl methacrylate/n-butyl acrylate (E/AMA/n-BA) | E:73.1/AMA:0.9/n-BA:26 |
| B-4 | Ethylene/allyl methacrylate/vinyl acetate (E/AMA/VA) | E:72.5/AMA:2.5/AV:25 |
| B-5 | Ethylene/allyl methacrylate/glycidyl methacrylate (E/AMA/GMA) | E:85.9/AMA:1.1/GMA:13 |
| B-6 | Ethylene/allyl methacrylate/ethyl acrylate (E/AMA/EA) | E:83.2/AMA:1.8/EA:15 |
| | Rubbers and resins as modifier | Remarks |
| C-1 | Ethylene/propylene/diene coplymer rubber (EPDM) | JSR EP 57P:* |
| D-1 | Ethylene/glycidyl methacrylate/ethylene acryate (E/GMA/EA) | E:60/GMA:13/EA:27 |
| D-2 | Ethylene/glycidyl methacrylate/ethylene acryate (E/GMA/EA) | E:83/GMA:5/EA:12 |
| D-3 | Ethylene/vinyl acetate copolymer (EVA) | NISSEKI REXLON V270:* |
| D-4 | Ethylene/ethyl acrylate (EEA) | NISSEKI REXLON A4250:* |
| D-5 | Ethylene/glycidyl methaacryate copolymer (EGMA) | NISSEKI REXPARL RA4100:* |
| D-6 | Ethylene/glycidyl methacrylate copolymer (EGMA) | NISSEKI REXPARL RA31500:* |
| | Graft copolymers and curing agents | Remarks |
| F-1 | Polypropylene-g-poly(styrene-acrylonitrile) (PP-g-AS) | Modiper A3400+ |
| F-2 | Poly(ethylene-glycidyl methacrylate)-g-poly(styrene-acrylonitrile) (EGMA-g-AS) | Modiper A4400+ |

TABLE 1-continued

| | | |
|---|---|---|
| F-3 | Poly(ethylene-glycidyl methacrylate)-g-polymethyl methacrylate (EGM-b-PMMA) | Modoper A4200+ |
| F-4 | Polypropylene-g-polystyrene (PP-g-PST) | Modiper A3200+ |
| F-5 | Very low-density polyethylene-g-maleic anhydride (VLDPE-g-MAn) | NISSEKI N Polymer L6040* |
| F-6 | Ethylene-ethyl acrylate copolymer-g-maleic anhydride (EEA-g-MAn) | NISSEKI N Polymer A1600* |
| E-1 | Bisphenol resin (Bis P) | Vulkresol 315E** |

*Japan Synthetic Rubber Co., Ltd.
+Nippon Oil and Fats Co., Ltd.
°Nippon Petrochemicals Co., Ltd.
**Hechst Co., Ltd.

TABLE 2

| Resins | Examples | | | | | | | | | | | | | Comparative Examples | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 | 6 |
| | (Parts by Wt.) | | | | | | | | | | | | | | | | | | |
| ABS | 100 | 100 | 100 | 100 | 100 | 90 | 90 | 90 | — | — | — | — | — | 100 | 100 | 100 | — | — | — |
| POM | — | — | — | — | — | — | — | — | 100 | 100 | 100 | 100 | 100 | — | — | — | 100 | 100 | 100 |
| B-1 (E/AMA) | 10 | — | — | — | — | — | 10 | — | 10 | 10 | — | — | — | — | — | — | — | — | — |
| B-2 (E/AMA) | — | — | — | — | 10 | 15 | — | 20 | — | — | — | — | — | — | — | — | — | — | — |
| B-4 (E/AMA/VA) | — | 15 | 25 | — | — | — | — | — | — | — | — | — | — | — | — | — | — | — | — |
| B-5 (E/AMA/GMA) | — | — | — | — | — | — | — | — | — | — | — | 10 | 15 | — | — | — | — | — | — |
| B-6 (E/AMA/EA) | — | — | — | 20 | — | — | — | — | — | — | 10 | — | — | — | — | — | — | — | — |
| C-1 (EPDM) | — | — | — | — | 10 | 15 | — | — | — | — | — | — | 5 | — | 20 | — | — | — | 10 |
| D-3 (EVA) | — | — | — | — | — | — | 20 | — | — | — | — | 10 | — | — | — | 20 | — | 10 | — |
| D-4 (EEA) | — | — | — | — | — | — | — | 10 | — | — | — | — | — | — | — | — | — | — | — |
| D-5 (EGMA) | — | — | — | — | — | — | — | — | 10 | — | — | — | — | — | — | — | — | 10 | — |
| F-6 (EEA-g-MAn) | — | — | — | — | — | — | — | — | — | 10 | 10 | — | — | — | — | — | — | — | 10 |
| Izod Impact Strength (Kgfcm/cm) | 28 | 41 | 48 | 38 | 47 | N.B | 36 | 34 | 17 | 15 | 25 | 19 | 21 | 18 | 24 | 22 | 7 | 12 | 13 |

N.B = Not breakdown

TABLE 3

| Resin | Examples | | | | | | | | | | | Comparative Examples | | | | | | |
|---|---|---|---|---|---|---|---|---|---|---|---|---|---|---|---|---|---|---|
| | 14 | 15 | 16 | 17 | 18 | 19 | 20 | 21 | 22 | 23 | 24 | 7 | 8 | 9 | 10 | 11 | 12 | 13 |
| | (Parts by Wt.) | | | | | | | | | | | | | | | | | |
| PBT | 90 | 80 | 80 | 80 | 80 | — | — | — | — | — | — | 100 | 90 | 90 | 80 | — | — | — |
| PET | — | — | — | — | — | 90 | 80 | 90 | 80 | 85 | 80 | — | — | — | — | 100 | 90 | 80 |
| B-1 (E/AMA) | — | — | — | 7 | — | — | — | — | — | — | — | — | — | — | — | — | — | — |
| B-2 (E/AMA) | — | — | — | — | 10 | — | — | — | 5 | 10 | — | — | — | — | — | — | — | — |
| B-3 (E/AMA/n-BA) | — | — | 10 | — | — | 10 | 20 | — | — | — | — | — | — | — | — | — | — | — |
| B-5 (E/AMA/GMA) | — | 10 | — | — | — | — | — | 5 | 10 | — | — | — | — | — | — | — | — | — |
| B-6 (E/AMA/EA) | 10 | — | — | — | — | — | — | 5 | 10 | — | — | — | — | — | — | — | — | — |
| C-1 (EPDM) | — | 10 | — | 12 | — | — | — | — | — | — | — | — | — | — | 10 | — | — | — |
| D-1 (E/GMA/EA) | — | — | — | — | 10 | — | — | — | — | — | — | — | — | — | — | — | — | — |
| D-2 (E/GMA/EA) | — | — | — | — | — | — | — | — | — | — | — | — | — | 10 | — | — | — | — |
| D-4 (EEA) | — | — | — | — | — | — | — | — | — | — | — | — | 10 | — | — | — | — | 10 |
| E-1 (BisP) | — | — | — | 1 | — | — | — | — | — | — | — | — | — | — | — | — | — | — |
| F-2 (EGMA-g-AS) | — | — | — | — | — | — | — | — | — | — | — | — | — | — | 10 | — | 10 | 10 |
| F-3 (EGMA-g-PMMA) | — | — | 10 | — | — | — | — | — | — | 10 | 10 | — | — | — | — | — | — | — |
| Izod Impact Strength (Kgfcm/cm) | 18 | 48 | 42 | N.B | 45 | 7.2 | 16 | 14 | 27 | 22 | 31 | 5.5 | 8.2 | 22 | 21 | 3.7 | 13 | 15 |

N.B = Not breakdown

TABLE 4

| Resins | Examples | | | | | | | Comparative Examples | | | |
|---|---|---|---|---|---|---|---|---|---|---|---|
| | 25 | 26 | 27 | 28 | 29 | 30 | 31 | 14 | 15 | 16 | 17 |
| | (Parts by Wt.) | | | | | | | (Parts by Wt.) | | | |
| PA | 90 | 90 | 85 | 90 | 90 | 80 | 80 | 100 | 90 | 90 | 80 |
| B-1 (E/AMA) | 5 | 5 | 5 | — | — | — | — | — | — | — | — |
| B-3 (E/AMA/n-BA) | — | — | — | 10 | — | — | — | — | — | — | — |
| B-5 (E/AMA/GMA) | — | — | — | — | 10 | 10 | 10 | — | — | — | — |
| B-6 (E/AMA/EA) | — | — | — | — | — | — | — | — | — | — | — |
| D-3 (EVA) | — | — | — | — | — | 10 | — | — | — | — | — |
| D-4 (EEA) | — | — | — | — | — | — | 10 | — | — | — | — |
| D-6 (EGMA) | 5 | — | — | — | — | — | — | — | — | 10 | 20 |
| F-5 (VLDPE-g-MAn) | — | 5 | — | — | — | — | — | — | 10 | — | — |
| F-6 (EEA-g-MAn) | — | — | 10 | — | — | — | — | — | — | — | — |
| Izod Impact Strength | 17 | 15 | 35 | 16 | 28 | 43 | 39 | 5.1 | 11 | 16 | 26 |

TABLE 4-continued

| Resins | Examples 25 | 26 | 27 | 28 | 29 | 30 | 31 | Comparative Examples 14 | 15 | 16 | 17 |
|---|---|---|---|---|---|---|---|---|---|---|---|
| | (Parts by Wt.) | | | | | | | (Parts by Wt.) | | | |
| (Kgfcm/cm) | | | | | | | | | | | |

N.B = Not breakdown

TABLE 5

| Resins | Examples 32 | 33 | 34 | 35 | 36 | 37 | 38 | 39 | 40 | 41 | Comparative Examples 18 | 19 | 20 | 31 | 22 | 23 |
|---|---|---|---|---|---|---|---|---|---|---|---|---|---|---|---|---|
| | (Parts by Wt.) | | | | | | | | | | (Parts by Wt.) | | | | | |
| ABS | 80 | 80 | 70 | 30 | 20 | — | — | — | — | — | 80 | 80 | 20 | — | — | — |
| POM | — | — | — | — | — | 80 | 80 | 70 | 30 | 20 | — | — | — | 80 | 70 | 30 |
| PP | 20 | 20 | 30 | 60 | 80 | 20 | 20 | 30 | 70 | 80 | 20 | 20 | 80 | 20 | 30 | 70 |
| B-1 (E/AMA) | 10 | — | — | — | 15 | 10 | — | — | — | — | — | — | — | — | — | — |
| B-2 (E/AMA) | — | — | — | 10 | — | — | — | 10 | — | — | | | | | | |
| B-3 (E/AMA/n-BA) | — | 10 | 20 | — | — | — | — | — | — | 10 | — | — | — | — | — | — |
| B-4 (E/AMA/VA) | — | — | — | — | — | — | 10 | — | — | — | | | | | | |
| B-5 (E/AMA/GMA) | — | — | — | — | — | — | — | — | 5 | — | — | — | — | — | — | — |
| D-3 (EVA) | — | — | — | — | — | — | — | — | — | — | 15 | — | — | — | — | — |
| D-5 (EGMA) | — | — | — | — | — | — | 10 | — | — | — | — | — | — | 20 | — | — |
| D-6 (EGMA) | — | — | — | — | — | 10 | — | — | — | — | — | — | — | — | — | — |
| F-1 (PP-g-AS) | — | — | — | 10 | 10 | — | — | — | — | — | — | 10 | 20 | — | — | — |
| F-4 (PP-g-PSt) | — | — | — | — | — | — | — | 10 | 10 | 10 | — | — | — | — | 10 | 10 |
| Izod Impact Strength (Kgfcm/cm) | 38 | 43 | 42 | 29 | 32 | 15 | 27 | 24 | 25 | 32 | 10 | 27 | 21 | 8 | 14 | 13 |

TABLE 6

| Resins | Examples 42 | 43 | 44 | 45 | 46 | 47 | 48 | 49 | 50 | 51 | Comparative Examples 24 | 25 | 26 | 27 | 28 | 29 |
|---|---|---|---|---|---|---|---|---|---|---|---|---|---|---|---|---|
| | (Parts by Wt.) | | | | | | | | | | (Parts by Wt.) | | | | | |
| PBT | 90 | 80 | 80 | 70 | 60 | — | — | — | — | — | 90 | 70 | 60 | — | — | — |
| PA | — | — | — | — | — | 90 | 80 | 80 | 70 | 70 | — | — | — | 90 | 80 | 80 |
| PP | 10 | 20 | 20 | 30 | 40 | 10 | 20 | 20 | 30 | 30 | 10 | 30 | 40 | 10 | 20 | 20 |
| B-1 (E/AMA) | 10 | — | — | 10 | 10 | 5 | 5 | — | — | — | — | — | — | — | — | — |
| B-2 (E/AMA) | — | — | — | — | — | — | — | 5 | — | — | | | | | | |
| B-3 (E/AMA/n-BA) | — | 10 | — | — | — | — | — | — | — | — | — | — | — | — | — | — |
| B-4 (E/AMA/VA) | — | — | — | — | — | 10 | — | 15 | 10 | | | | | | | |
| B-5 (E/AMA/GMA) | — | — | 10 | — | — | — | — | — | — | — | — | — | — | — | — | — |
| D-3 (EVA) | — | — | 10 | — | — | — | — | — | — | 5 | — | — | — | — | — | — |
| D-5 (EGMA) | 10 | 10 | — | — | — | — | — | — | — | — | — | — | — | — | — | — |
| D-6 (EGMA) | — | — | — | — | — | — | 10 | — | — | — | — | — | 10 | — | 10 | — |
| F-3 (EGMA-g-PMMA) | — | — | — | 10 | — | — | — | — | — | — | 20 | — | — | — | — | — |
| F-4 (PP-g-PSt) | — | — | — | — | 10 | — | — | — | — | — | — | 20 | — | — | — | 20 |
| F-5 (VLDPE-g-MAn) | — | — | — | — | — | 5 | — | — | — | — | — | — | — | 10 | — | — |
| F-6 (EEA-g-MAn) | — | — | — | — | — | — | 10 | — | — | — | — | — | — | — | — | — |
| Izod Impact Strength (Kgfcm/cm) | 30 | 39 | 33 | 42 | 38 | 12 | 19 | 24 | 31 | 37 | 21 | 23 | 16 | 7.2 | 13 | 16 |

TABLE 7

| Resins | Examples 52 | 53 | 54 | 55 | 56 | 57 | 58 | 59 | 60 | 61 | Comparative Examples 30 | 31 | 32 | 33 | 34 | 35 |
|---|---|---|---|---|---|---|---|---|---|---|---|---|---|---|---|---|
| | (Parts by Wt.) | | | | | | | | | | (Parts by Wt.) | | | | | |
| PA | 80 | 80 | 70 | 30 | 20 | 80 | 80 | 70 | 30 | 20 | 80 | 70 | 30 | 80 | 70 | 20 |
| PPO | 20 | 20 | 30 | 70 | 80 | — | — | — | — | — | 20 | 30 | 70 | — | — | — |
| POM | — | — | — | — | — | 20 | 20 | 30 | 70 | 80 | — | — | — | 20 | 30 | 80 |
| B-1 (E/AMA) | 5 | 5 | — | — | — | — | — | — | — | — | — | — | — | — | — | — |
| B-2 (E/AMA) | — | — | — | — | — | 5 | — | — | — | — | — | — | — | — | — | — |
| B-5 (E/AMA/GMA) | — | — | — | 10 | 10 | — | 10 | 10 | 5 | 10 | — | — | — | — | — | — |
| B-6 (E/AMA/EA) | — | — | 20 | — | — | — | — | — | — | — | — | — | — | — | — | — |
| C-1 (EPDM) | — | — | — | 10 | — | 10 | — | — | 10 | — | — | — | — | 10 | — | — |
| D-3 (EVA) | — | — | — | — | — | — | 10 | — | — | 10 | — | — | — | — | 10 | 10 |
| D-5 (EGMA) | — | — | — | — | — | — | — | — | — | — | — | — | — | 10 | — | — |
| D-6 (EGMA) | — | — | — | — | — | — | — | — | — | — | — | — | — | — | 10 | — |
| F-4 (PP-g-PSt) | — | — | — | — | 10 | — | — | — | — | — | — | — | — | — | — | — |
| F-5 (VLDPE-g-MAn) | 10 | — | — | — | — | — | — | — | — | — | — | 10 | — | — | — | 10 |
| F-6 (EEA-g-MAn) | — | 10 | — | — | — | — | — | 10 | — | — | — | 10 | 10 | — | — | — |
| Izod Impact Strength (Kgfcm/cm) | 26 | 29 | 28 | N.B | N.B | 23 | 38 | 46 | 49 | 34 | 11 | 14 | 22 | 23 | 22 | 11 |

N.B = Not breakdown

TABLE 8

| Resins | Examples 62 | 63 | 64 | 65 | 66 | 67 | 68 | 69 | 70 | 71 | Comparative Examples 36 | 37 | 38 | 39 | 40 | 41 |
|---|---|---|---|---|---|---|---|---|---|---|---|---|---|---|---|---|
| | (Parts by Wt.) | | | | | | | | | | (Parts by Wt.) | | | | | |
| PA | 80 | 80 | 70 | 20 | 30 | 80 | 70 | 70 | 30 | 20 | 80 | 70 | 30 | 80 | 70 | 30 |
| PC | 20 | 20 | 30 | 80 | 70 | — | — | — | — | — | 20 | 30 | 70 | — | — | — |
| PPS | — | — | — | — | — | 20 | 30 | 30 | 70 | 80 | — | — | — | 20 | 30 | 70 |
| B-1 (E/AMA) | 5 | — | — | — | — | — | — | — | — | — | — | — | — | — | — | — |
| B-2 (E/AMA) | — | 5 | — | — | — | 5 | 5 | — | 5 | — | — | — | — | — | — | — |
| B-3 (E/AMA/n-BA) | — | — | — | — | — | — | — | — | — | 10 | — | — | — | — | — | — |
| B-5 (E/AMA/GMA) | — | — | 10 | 10 | — | — | — | 15 | — | — | — | — | — | — | — | — |
| B-6 (E/AMA/EA) | — | — | — | — | 10 | — | — | — | — | — | — | — | — | — | — | — |
| C-1 (EPDM) | — | — | — | 10 | — | — | — | — | — | — | — | — | — | — | — | — |
| D-3 (EVA) | — | — | 10 | — | — | — | — | — | — | — | — | — | — | — | — | — |
| F-2 (EGMA-g-AS) | — | — | — | — | 10 | — | — | — | 15 | 15 | — | — | 10 | — | — | 15 |
| F-5 (VLDPE-g-MAn) | 10 | — | — | — | — | 10 | — | — | — | — | 10 | — | — | 10 | — | — |
| F-6 (EEA-g-MAn) | — | 10 | — | — | — | — | 10 | — | — | — | — | 10 | — | — | 10 | — |
| Izod Impact Strength (Kgfcm/cm) | 24 | 28 | 37 | N.B | 46 | 18 | 26 | 36 | 23 | 32 | 15 | 18 | 28 | 12 | 13 | 9 |

N.B = Not breakdown

TABLE 9

| Resins | Examples 72 | 73 | 74 | 75 | 76 | 77 | 78 | 79 | 80 | 81 | Comparative Examples 42 | 43 | 44 | 45 | 46 | 47 |
|---|---|---|---|---|---|---|---|---|---|---|---|---|---|---|---|---|
| | (Parts by Wt.) | | | | | | | | | | (Parts by Wt.) | | | | | |
| PBT | 80 | 80 | 70 | 30 | 20 | 90 | 80 | 70 | 30 | 20 | 80 | 70 | 30 | 80 | 70 | 20 |
| PPO | 20 | 20 | 30 | 70 | 80 | — | — | — | — | — | 20 | 30 | 70 | — | — | — |
| POM | — | — | — | — | — | 10 | 20 | 30 | 70 | 80 | — | — | — | 20 | 30 | 80 |
| B-1 (E/AMA) | 10 | — | — | — | — | 10 | — | — | — | — | — | — | — | — | — | — |
| B-2 (E/AMA) | — | 10 | — | — | — | — | 5 | — | — | — | — | — | — | — | — | — |
| B-4 (E/AMA/VA) | — | — | — | — | — | — | — | 10 | — | — | — | — | — | — | — | — |
| B-5 (E/AMA/GMA) | — | — | 20 | 10 | 10 | — | — | — | 10 | 10 | — | — | — | — | — | — |
| C-1 (EPDM) | — | — | 10 | — | — | — | — | 10 | 20 | 10 | — | — | 10 | — | — |
| D-3 (EVA) | — | — | — | — | 10 | — | — | — | — | — | — | — | — | — | — | — |
| D-4 (EEA) | — | — | — | 10 | — | — | — | — | — | — | 10 | 10 | — | — | — | — |
| D-5 (EGMA) | 10 | — | — | — | — | — | 15 | — | — | — | — | — | 10 | — | — | — |
| D-6 (EGMA) | — | 10 | — | — | — | — | — | — | — | — | — | — | — | — | 10 | — |
| F-2 (EGMA-g-AS) | — | — | — | — | — | — | — | — | — | — | 10 | — | — | — | — | — |
| F-3 (EGMA-g-PMMA) | — | — | — | — | — | — | — | 10 | — | — | — | 10 | — | — | — | 20 |
| Izod Impact Strength (Kgfcm/cm) | 24 | 33 | 28 | 27 | 31 | 24 | 32 | 45 | 51 | N.B | 10 | 8 | 7 | 7 | 19 | 20 |

N.B = Not breakdown

TABLE 10

| Resins | Examples 82 | 83 | 84 | 85 | 86 | 87 | 88 | 89 | 90 | 91 | Comparative Examples 48 | 49 | 50 | 51 | 52 | 53 |
|---|---|---|---|---|---|---|---|---|---|---|---|---|---|---|---|---|
| | (Parts by Wt.) | | | | | | | | | | (Parts by Wt.) | | | | | |
| PBT | 80 | 80 | 70 | 20 | 30 | 90 | 80 | 80 | 70 | 20 | 80 | 80 | 70 | 80 | 70 | 20 |
| PC | 20 | 20 | 30 | 80 | 70 | — | — | — | — | — | 20 | 20 | 30 | — | — | — |
| PPS | — | — | — | — | — | 10 | 20 | 20 | 30 | 80 | — | — | — | 20 | 30 | 80 |
| B-1 (E/AMA) | 10 | — | — | — | 10 | 10 | — | — | — | 10 | — | — | — | — | — | — |
| B-3 (E/AMA/n-BA) | — | — | — | 20 | — | — | 10 | 20 | — | — | — | — | — | — | — | — |
| B-5 (E/AMA/GMA) | — | 10 | 10 | — | — | — | — | — | 20 | — | — | — | — | — | — | — |
| C-1 (EPDM) | — | 10 | — | — | — | — | — | — | — | — | 20 | — | — | — | — | — |
| D-3 (EVA) | — | — | 20 | — | — | — | — | — | — | — | — | — | — | — | — | — |
| D-5 (EGMA) | 10 | — | — | — | — | 10 | 20 | — | — | — | — | 20 | — | — | — | — |
| D-6 (EGMA) | — | — | — | — | 10 | — | — | — | — | — | — | — | 10 | — | 15 | 10 |
| F-3 (EGMA-g-PMMA) | — | — | — | — | 10 | — | — | — | 10 | — | — | — | 10 | — | 0 |
| Izod Impact Strength (Kgfcm/cm) | 37 | 48 | 43 | 51 | 44 | 15 | 23 | 42 | 28 | 12 | 13 | 28 | 29 | 7 | 6 | 3 |

TABLE 11

| Resins | Examples 92 | 93 | 94 | 95 | 96 | 97 | 98 | 99 | 100 | 101 | Comparative Examples 54 | 55 | 56 | 57 | 58 | 59 |
|---|---|---|---|---|---|---|---|---|---|---|---|---|---|---|---|---|
| | (Parts by Wt.) | | | | | | | | | | (Parts by Wt.) | | | | | |
| POM | 80 | 80 | 70 | 30 | 20 | 80 | 70 | 30 | 20 | 20 | 80 | 70 | 30 | 80 | 70 | 20 |
| PC | 20 | 20 | 30 | 70 | 80 | — | — | — | — | — | 20 | 30 | 70 | — | — | — |
| PPS | — | — | — | — | — | 20 | 30 | 70 | 80 | 80 | — | — | — | 20 | 30 | 80 |
| B-1 (E/AMA) | 10 | — | — | 10 | 10 | 10 | 10 | — | — | — | — | — | — | — | — | — |
| B-2 (E/AMA) | — | — | — | — | — | — | — | — | — | — | 10 | — | — | — | — | — |
| B-3 (E/AMA/n-BA) | — | — | — | — | — | — | — | 10 | 10 | — | — | — | — | — | — | — |
| B-5 (E/AMA/GMA) | — | 20 | 15 | — | — | — | — | — | — | — | — | — | — | — | — | — |

TABLE 11-continued

| Resins | \multicolumn{10}{c|}{Examples} | | | | | | | | | | \multicolumn{6}{c}{Comparative Examples} | | | | | |
|---|---|---|---|---|---|---|---|---|---|---|---|---|---|---|---|---|
| | 92 | 93 | 94 | 95 | 96 | 97 | 98 | 99 | 100 | 101 | 54 | 55 | 56 | 57 | 58 | 59 |
| | \multicolumn{10}{c|}{(Parts by Wt.)} | | | | | | | | | | \multicolumn{6}{c}{(Parts by Wt.)} | | | | | |
| C-1 (EPDM) | — | — | — | 10 | 10 | — | — | — | — | — | 10 | — | — | — | — | — |
| D-4 (EEA) | — | — | 10 | — | — | — | — | — | — | — | — | 10 | — | — | — | — |
| D-6 (EGMA) | 10 | — | — | — | — | — | — | — | — | — | 10 | 10 | — | — | — | — |
| F-2 (EGMA-g-AS) | — | — | — | — | — | 10 | — | 10 | — | 10 | — | — | — | 10 | — | — |
| F-3 (EGMA-g-PMMA) | — | — | — | — | — | — | 10 | — | — | — | — | — | — | 10 | — | 10 |
| F-4 (PP-g-PSt) | — | — | — | — | — | — | — | — | 10 | — | — | — | — | — | — | 10 |
| Izod Impact Strength (Kgfcm/cm) | 36 | 43 | N.B | N.B | N.B | 19 | 18 | 31 | 28 | 27 | 22 | 17 | 24 | 16 | 9 | 12 |

TABLE 12

| Resins | \multicolumn{10}{c|}{Examples} | | | | | | | | | | \multicolumn{6}{c}{Comparative Examples} | | | | | |
|---|---|---|---|---|---|---|---|---|---|---|---|---|---|---|---|---|
| | 102 | 103 | 104 | 105 | 106 | 107 | 108 | 109 | 110 | 111 | 60 | 61 | 62 | 63 | 64 | 65 |
| | \multicolumn{10}{c|}{(Parts by Wt.)} | | | | | | | | | | \multicolumn{6}{c}{(Parts by Wt.)} | | | | | |
| ABS | 90 | 80 | 60 | 30 | 20 | 90 | 80 | 60 | 30 | 20 | 80 | 70 | 20 | 80 | 70 | 20 |
| PA | 10 | 20 | 40 | 70 | 80 | — | — | — | — | — | 20 | 30 | 80 | — | — | — |
| PBT | — | — | — | — | — | 10 | 20 | 40 | 70 | 80 | — | — | — | 20 | 30 | 80 |
| B-1 (E/AMA) | 10 | — | — | 10 | — | — | — | — | 10 | — | — | — | — | — | — | — |
| B-2 (E/AMA) | — | 10 | — | — | — | 10 | — | — | — | — | — | — | — | — | — | — |
| B-3 (E/AMA/n-BA) | — | — | 10 | — | — | — | — | 20 | — | — | — | — | — | — | — | — |
| B-4 (E/AMA/VA) | — | — | — | — | — | — | 20 | — | — | — | — | — | — | — | — | — |
| B-5 (E/AMA/GMA) | — | — | — | — | 10 | — | — | — | — | 5 | — | — | — | — | — | — |
| C-1 (EPDM) | — | — | — | — | — | — | — | — | — | 20 | — | — | — | 10 | — | 10 |
| D-1 (E/GMA/EA) | — | — | — | — | — | — | — | — | 20 | — | — | — | — | — | — | — |
| D-3 (EVA) | — | — | — | — | — | — | — | — | — | — | 10 | — | — | — | — | — |
| D-4 (EEA) | — | — | — | — | — | — | — | — | — | — | — | 20 | 20 | — | — | — |
| D-5 (EGMA) | — | — | — | — | — | — | — | — | — | — | — | — | — | — | 10 | 15 |
| D-6 (EGMA) | — | — | — | — | — | — | — | — | — | — | — | — | 20 | — | — | — |
| F-2 (EGMA-g-AS) | — | — | 10 | 11 | — | — | — | — | — | — | — | — | — | — | — | — |
| Izod Impact Strength (Kgfcm/cm) | 46 | 43 | N.B | N.B | N.B | 51 | N.B | N.B | N.B | N.B | 12 | 17 | 26 | 13 | 21 | 51 |

N.B = Not breakdown

TABLE 13

| Resins | \multicolumn{10}{c|}{Examples} | | | | | | | | | | \multicolumn{6}{c}{Comparative Examples} | | | | | |
|---|---|---|---|---|---|---|---|---|---|---|---|---|---|---|---|---|
| | 112 | 113 | 114 | 115 | 116 | 117 | 118 | 119 | 120 | 121 | 66 | 67 | 68 | 69 | 70 | 71 |
| | \multicolumn{10}{c|}{(Parts by Wt.)} | | | | | | | | | | \multicolumn{6}{c}{(Parts by Wt.)} | | | | | |
| ABS | 80 | 70 | 70 | 30 | 20 | 80 | 80 | 70 | 30 | 20 | 80 | 70 | 30 | 80 | 70 | 20 |
| POM | 20 | 30 | 30 | 70 | 80 | — | — | — | — | — | 20 | 30 | 70 | — | — | — |
| PPS | — | — | — | — | — | 20 | 20 | 30 | 70 | 80 | — | — | — | 20 | 30 | 80 |
| B-1 (E/AMA) | — | — | — | 10 | — | 10 | — | — | — | — | — | — | — | — | — | — |
| B-2 (E/AMA) | 10 | 10 | — | — | — | — | — | — | 5 | 5 | — | — | — | — | — | — |
| B-3 (E/AMA/n-BA) | — | — | — | — | 20 | — | 10 | — | — | — | — | — | — | — | — | — |
| B-4 (E/AMA/VA) | — | 10 | 20 | — | — | — | — | — | — | — | — | — | — | — | — | — |
| B-5 (E/AMA/GMA) | — | — | — | — | — | — | — | 10 | — | 5 | — | — | — | — | — | — |
| B-6 (E/AMA/EA) | — | — | — | — | — | — | — | — | — | — | — | — | — | — | — | — |
| C-1 (EPDM) | — | — | — | — | — | — | — | — | — | — | 10 | — | — | — | — | 10 |
| D-1 (E/GMA/EA) | — | — | — | — | — | — | — | — | — | — | — | — | — | — | — | 10 |
| D-2 (E/GMA/EA) | — | — | — | — | — | — | — | — | — | — | — | — | — | — | — | — |
| D-3 (EVA) | — | — | — | — | — | — | — | — | — | — | — | 20 | — | — | — | — |
| D-4 (EEA) | — | — | — | — | — | — | — | — | — | — | — | — | — | — | — | — |
| D-5 (EGMA) | — | — | — | — | — | — | — | — | — | — | 10 | — | — | — | — | — |
| D-6 (EGMA) | — | — | — | — | — | — | — | — | — | — | — | — | — | 20 | — | 10 |
| F-1 (PP-g-AS) | — | — | — | — | — | — | — | — | — | — | — | — | 20 | — | 10 | — |
| F-2 (EGMA-g-AS) | — | — | — | 10 | — | — | — | — | 10 | — | — | — | — | — | — | — |
| Izod Impact Strength (Kgfcm/cm) | 41 | 42 | 35 | 32 | 39 | 23 | 33 | 31 | 25 | 34 | 15 | 18 | 20 | 13 | 15 | 18 |

What is claimed is:

1. A thermoplastic resin composition comprising 99 to 50% by weight of at least one of engineering plastics (A) selected from the group consisting of polystyrene, styrene/acrylonitrile copolymer, styrene/methyl methacrylate/acrylonitrile copolymer, alpha-methyl styrene/styrene/acrylontrile copolymer, acrylonitrile/butadiene/styrene copolymer (ABS), methyl methacrylate/butadiene/styrene copolymer (MBS), acrylonitrile/EPR/styrene copolymers (AES), acryl rubber/acrylonitrile/styrene copolymers (AAS), polymethacrylate resin, polyacetal resin, polyamide resin, polycarbonate resin, polyphenylene ether resin, polyester resin, polyphenylene sulfide resin, and mixtures thereof and 1 to 50% by weight of an ethylene copolymer (B) having carbon-carbon unsaturated double bonds comprising 50-99.9% by weight of ethylene (B1), 0.01 to 10% by weight of a monomer (B2) selected from the group consisting of vinyl (meth)acrylate and allyl (meth)acrylate, and less than 40% by weight of another unsaturated monomer (B3).

2. A thermoplastic resin composition according to claim 1 wherein said composition contains further 1 to 200 parts by weight, based on 100 parts by weight of the resin (A)+(B), of at least one member selected from the group consisting of a rubber-like elastomer (C) and an olefin polymer or copolymer (D).

3. A thermoplastic resin composition according to claim 1 wherein said composition contains further 3 to 100 parts by weight, based on 100 parts by weight of the resin (A)+(B), of at least one member selected from the group consisting of a rubber-like elastomer (C) and an olefin polymer or copolymer (D).

4. A thermoplastic resin composition according to claim 1 wherein said composition contains further 0.01 to 10% by weight of a curing agent (E).

5. A thermoplastic resin composition as claimed in claim 1, wherein said composition contains further a compatibility agent (F).

* * * * *